United States Patent [19]

Goldstein

[11] 4,368,527
[45] Jan. 11, 1983

[54] PHONOGRAPH CARTRIDGE ALIGNMENT

[76] Inventor: Michael J. Goldstein, 44 Seacord Rd., New Rochelle, N.Y. 10804

[21] Appl. No.: 96,695

[22] Filed: Nov. 23, 1979

[51] Int. Cl.³ .............................................. G11B 3/10
[52] U.S. Cl. .................................... 369/55; 33/180 R
[58] Field of Search ......................... 33/180 R, 181 R; 369/57, 55, 56

[56] References Cited

U.S. PATENT DOCUMENTS

| | | | |
|---|---|---|---|
| 2,740,296 | 4/1956 | Andres | 369/55 X |
| 3,283,411 | 11/1966 | Steward | 369/55 |
| 4,003,133 | 1/1977 | Pieyik | 33/286 |
| 4,123,064 | 10/1978 | Matsukata | 369/57 X |
| 4,295,277 | 10/1981 | Dennesen et al. | 369/55 |
| 4,326,283 | 4/1982 | Torlan et al. | 369/55 |

FOREIGN PATENT DOCUMENTS 468067 11/1928 Fed. Rep. of Germany ........ 369/55

Primary Examiner—Steven L. Stephan
Attorney, Agent, or Firm—Darby & Darby

[57] ABSTRACT

The disclosure describes a template and method for using it to properly position and align a cartridge on a tone arm. The template has a hole that fits over a spindle and allows the template to be placed on a turntable. An index line is then aligned between the spindle and the pivotal axis of the tone arm. A point marked on the template is then properly positioned to set the proper tone arm overhang, and a mirror surface helps to properly align the cartridge.

15 Claims, 6 Drawing Figures

PHONOGRAPH CARTRIDGE ALIGNMENT

The present invention relates generally to phonograph devices employing a turntable and a phonograph cartridge at the end of a pivotally mounted tone arm and, more particularly, concerns a method and apparatus for aligning the phonograph cartridge with respect to the tone arm and turntable.

Modern stereophonic record discs are made with the aid of a cutting stylus which progresses radially towards the center of the record and, in the process, cuts an inwardly spiralling groove in which the sound for each of the sterephonic channels is encoded in undulations of a respective one of the opposed side walls of the groove. Hence, simultaneous portions of the signals for the two channels are recorded at corresponding points on the opposed walls.

A conventional phonograph includes a turntable on which the record disc to be played is rested so that a turntable spindle protrudes through a hole in the disc, a tone arm which is pivotally mounted at a point remote from the turntable, and a cartridge which is mounted at the free end of the tone arm. The cartridge has a stylus assembly including an angularly depending shaft, one end of which has a stylus which extends into the groove on the record and follows the undulations in the groove walls to produce electrical signals representing the recorded sound for the respective channels.

Inasmuch as the tone arm pivots and has a fixed length, the cartridge stylus is incapable of following a radial path on the record, as the recording stylus did. Instead, the cartridge stylus follows an arcuate path as the tone arm pivots. This arcuate path causes the stylus to rotate clockwise with respect to the groove as it progresses towards the record center. Hence, the stylus is not tangent to the path of the groove, but is rotated or skewed with respect to a tangent, causing one wall of the groove to be contacted ahead of the other. The results in a time delay or phase distortion between the signals for the two channels. Unfortunately, the human ear is extremely sensitive to phase distortion. Thus, the distortion due to the arcuate path, called horizontal (lateral) tracking error, is highly perceptible and can be very disturbing to a listener.

In an effort to overcome horizontal tracking error, tone arms have been designed so as to appear to be infinite in length. Most often, this has involved manufacturing the tone arm so that there is an "offset angle" and an "overhang" for the stylus. The offset is a bend near the free end of the tone arm which is towards the spindle of the turntable. This positions the cartridge at an angle to the main body of the tone arm. "Overhang" refers to the characteristic that the tone arm is pivoted on one side of the turntable spindle while the arc swept by the stylus extends on the opposite side of the spindle.

In an article entitled "Cartridge Arm and Turntable vs. The Groove: Who's Winning?", in the July/August/September 1977 issue of the "Audio Critic", optimum cartridge alignment is disclosed. The author (Peter Aczel) provides a table which relates effective tone arm length to the required offset angle and overhang. This optimum combination minimizes lateral tracking error. This table is derived from equations which were first disclosed by H. G. Baerwald in an article published in the December 1941 issued of the "Journal of the Society of Motion Picture Engineers". Basically, this table and the Baerwald equations predict that optimum tracking is achieved with a pivoted tone arm when a prescribed overhang and offset angle, related to the effective tone arm length, are provided. In particular, minimum tracking error for the entire record is achieved when adjustment is made for the optimum arm length/overhang combination and zero tracking error is achieved simultaneously at two predetermined radial distances (hereafter referred to as "the Baerwald radii") from the turntable spindle axis. It has been found that, after cartridge alignment in accordance with the Baerwald equations, a marked improvement in sound quality will be obtained with virtually any phonograph, regardless of its quality.

Unfortunately, the procedure suggested in the Audio Critic article is relatively complicated and cumbersome. Initially, it is necessary to measure the effective tone arm length, (i.e. the distance between the stylus and the pivot axis of the tone arm). Next, the tone arm is pivoted over the center of the turntable and the distance between the turntable spindle axis and stylus (i.e. the overhang) is adjusted to the value indicated for the corresponding tone arm length in the table. While making this adjustment, it is likely that the effective tone arm length will be changed, so that repeated tone arm length measurements and overhang adjustments are likely to be necessary until the optimum combination is achieved. With this done, the offset angle is adjusted by twisting the cartridge until zero tracking error is achieved at the Baerwald radii. This latter adjustment, however, interacts with the arm length and overhang adjustments, so that it may then be necessary to repeat all of the preceeding steps several times until all of the adjustments are simultaneously correct. What complicates the alignment process even further is that no reliable procedure is disclosed by the Audio Critic article for determining when zero tracking error is achieved at the two Baerwald radii. This is no simple adjustment and, until the present invention, could only be done very crudely by eye.

Broadly, it is an object of the present invention to achieve optimum alignment of a phonograph cartridge without performing a complex, multiple step, repetitive process. It is a specific object of the present invention to provide a method and apparatus for aligning a phonograph cartridge which achieve the foregoing object.

It is also an object of the present invention to provide an apparatus for optimally aligning a phonograph cartridge which is convenient and reliable in use, yet relatively simple and inexpensive in construction.

Through experimentation, I have found that the stylus in every optimally aligned cartridge/tone arm combination, regardless of the tone arm length, passes through a fixed point in traversing the turntable. The fixed point is fixed in the sense that it has an unvarying relationship to the tone arm pivot axis and the turntable spindle axis. Specifically, the tone arm pivot axis, the turntable spindle axis, and the fixed point define three points in the plane of the turntable which correspond to the three vertices of a right triangle in which the hypotenuse is equal to the effective tone arm length, a first side is equal to the effective tone arm length minus the overhang, and the other side is equal to the distance between the turntable spindle axis and the fixed point (a constant value). The Pythagorean theorem then predicts that the square of the distance of the fixed point from the turntable spindle axis is equal to the square of the effective arm length minus the square of the effective arm length less the overhang. Stated in mathematical terms, the distance d of the fixed point from the spindle axis is given by the following equation:

$$d = \sqrt{L^2 - (L - O)^2} \quad (1)$$

where L is the tone arm length and O is the corresponding optimum stylus overhang specified by the Baerwald equations. The distance of the fixed point from the spindle is constant once the record diameter and its recorded area are fixed—it does not depend on tone arm length. Thus, the location of the fixed point can be calculated using equation (1), once the optimum overhang for any tone arm length is known. Specifically, the fixed point could be located by constructing a perpendicular to a line extending between the tone arm pivot axis and the turntable spindle axis and then measuring off the calculated distance from the turntable spindle axis. The fixed point distance can be calculated from any optimum tone arm length (L) and stylus overhang (O) combination in the attached Table I, which is merely a tabulation of the optimum combinations obtained with the Baerwald equations as applied to a conventional 12-inch record. Clearly, additional values of L and O could be obtained by interpolating or extrapolating between or from values given in Table I.

In accordance with the method of my invention, a cartridge mounted on a tone arm is adjusted for optimum overhang by positioning the stylus so that its playing tip overlies the above-defined fixed point. This positioning is preferably achieved with the aid of an alignment apparatus which is mounted on the turntable, but it could also be achieved by providing indicia directly on the turntable itself. Furthermore, the adjustment can be achieved by sliding the cartridge with respect to the tone arm or by sliding the entire tone arm with respect to its pivot axis, or both, depending upon the adjustments available on the phonograph being aligned.

In accordance with a further aspect of my invention, I provide an apparatus for aligning a phonograph cartridge mounted on a pivoted tone arm. The apparatus is mounted on the turntable of the phonograph and includes an aperture which receives the spindle. The apparatus includes indexing means which permits it to be positioned in a predetermined orientation with respect to the tone arm pivot axis. In addition, the apparatus preferably includes a mirrored portion including an index line representing a radius of the turntable and index lines normal thereto at points corresponding to the fixed point and the Baerwald radii (these are tangents at the respective radii). The mirrored portion is positioned with respect to indexing means so that the turntable radius index line is normal to a line between the tone arm pivot axis and the turntable spindle axis when the apparatus is properly indexed. After the overhang is adjusted by positioning the stylus over the indicia corresponding to the fixed point, the optimum offset angle of the cartridge is adjusted by positioning the stylus, in turn, over the intersection of the turntable radius and each of the Baerwald radius tangent lines and then twisting the cartridge so that the tangent line longitudinally bisects the reflection of the stylus shaft. This provides a very accurate and simple method for determining zero offset at the two Baerwald radii.

The alignment apparatus may also be utilized to adjust the azimuth of the stylus (its orientation with respect to a vertical plane) by rotating the cartridge about the longitudinal tone arm axis until its front, lower, horizontal edge and the reflection thereof in the mirrored portion of the alignment apparatus appear to be parallel.

The foregoing brief description, as well as further objects, features and advantages of the present invention will be more completely understood from the following detailed description of presently preferred, but nonetheless illustrative, embodiments in accordance with the present invention, with reference being had to the drawing, wherein.

Figure 1:
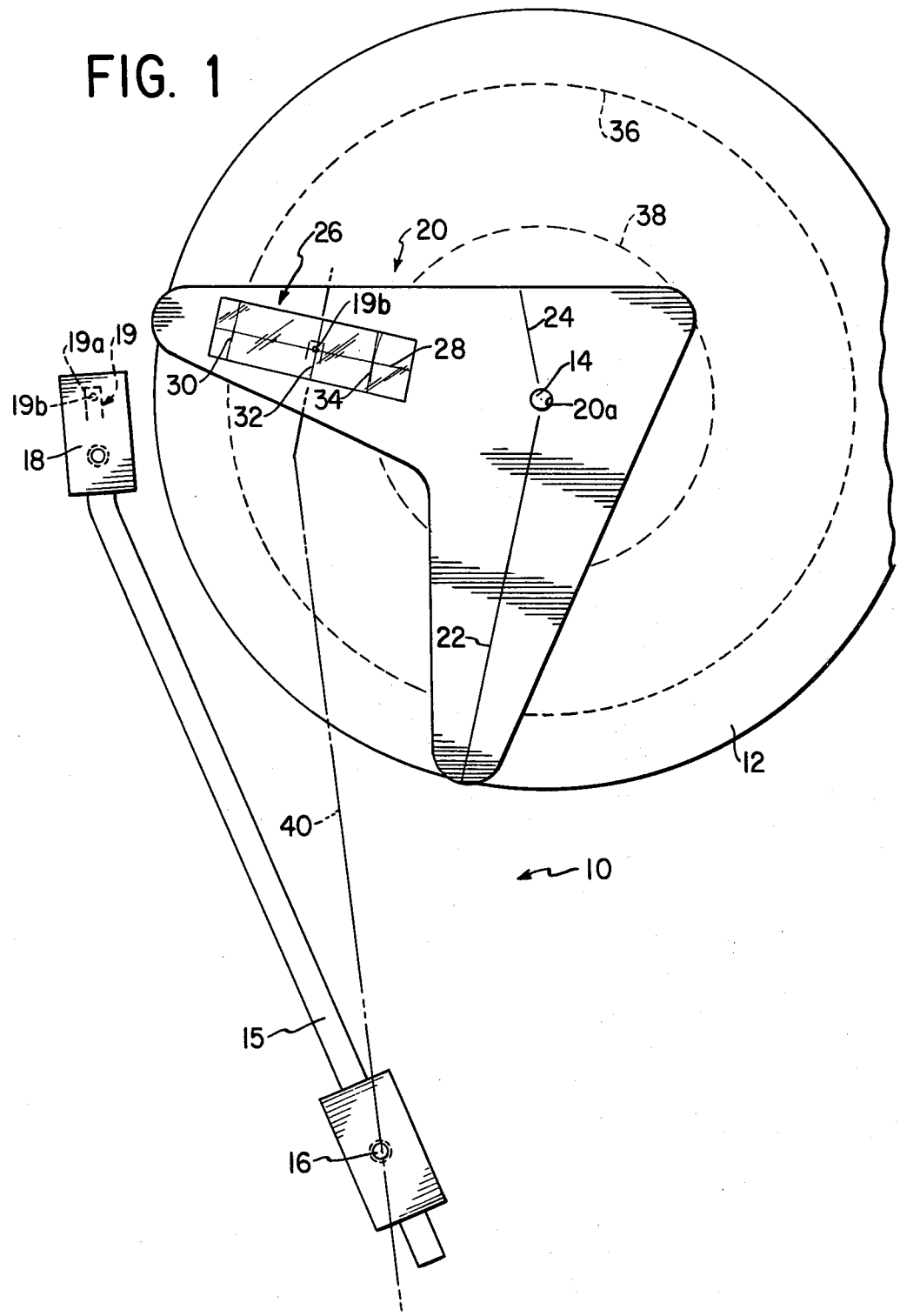
FIG. 1 is a plan view of a conventional phonograph with an alignment apparatus in accordance with the present invention mounted thereon in its indexed position for adjustment of optimum overhang.

Referring now to the details of the drawing, FIG. 1 illustrates a phonograph 10 on which an alignment apparatus 20, in accordance with the present invention, is mounted for use. The phonograph 10 includes a rotating turntable 12 with the spindle 14, an offset tone arm 15 which rotates about a pivot 16 and a cartridge 18 mounted at the free end of the tone arm and having a stylus assembly 19 with a shaft 19a and stylus 19b.

The alignment apparatus 20 is preferably made of plastic, but can be made of any convenient sheet material, including cardboard. The device can conveniently be made in the general shape of a boomerang so as to minimize the use of materials. An aperture 20a is provided in the apparatus 20 to receive the spindle 14 of turntable 12. In addition, the apparatus 20 includes the index lines 22 and 24 and a mirrored or reflective area 26. Preferably, the 26 comprises a transparent sheet, such as glass with a reflecting bottom, for the reason explained below. Mirrored area 26 has four index lines scribed thereon indicated, respectively, as 28, 30, 32 and 34. Index line 28 extends toward the center of aperture 20a and is perpendicular to index line 22. Index line 32 is normal to index line 28 and crosses it at the radial distance of the fixed point, so that the intersection of these two lines defines the fixed point. Index lines 30 and 34 are tangent to the circles 36 and 38, respectively, each having a radius equal to one of the two Baerwald radii at which zero horizontal tracking error must be achieved. The preferred embodiment was designed for use with a phonograph for conventional 12-inch records. In this case, the two Baerwald radii are 66.04 mm and 120.90 mm and the fixed point is at a distance of 89.323 mm from the center of aperture 20a.

For convenience of description, the tone arm 15 and cartridge 18 are represented by the offset, dashed line 40.

Before any adjustment can be made with the aid of alignment apparatus 20, the cartridge 18 must first be adjusted for correct azimuth. That is, the cartridge must be rotated using the tone arm 15 as an axis until stylus assembly 19 lies in a vertical plane. This can be achieved by lowering the stylus to mirrored portion 26 and rotating the cartridge until its undersurface is parallel to the portion 26. Alternately, the cartridge may be rotated until its lower front edge and the reflection thereof on mirrored portion 26 appear to be parallel.

When adjusting for optimum overhang, the apparatus 20 is positioned so that the index line 22, if extended, would intersect the axes of spindle 14 and pivot 16. The tip of stylus 19b is then positioned so as to overlie the intersection of lines 28 and 32, which defines the fixed point. This positioning is achieved by either moving the tone arm 15 axially with respect to spindle 14 or sliding cartridge 18 longitudinally on the tone arm 15. The actual procedure for making this adjustment will be determined by the adjustments that are possible with a particular tone arm/cartridge assembly. In any event, the adjustment is achieved by pivoting the tone arm so that it is positioned as indicated by the dashed line 40 in FIG. 1 and then sliding the tone arm or cartridge so that the tip of stylus 19b overlies the fixed point. Once this orientation has been achieved, the tone arm will be adjusted for optimum overhang regardless of its length and further adjustments of overhang will generally not be necessary.

Figure 2:
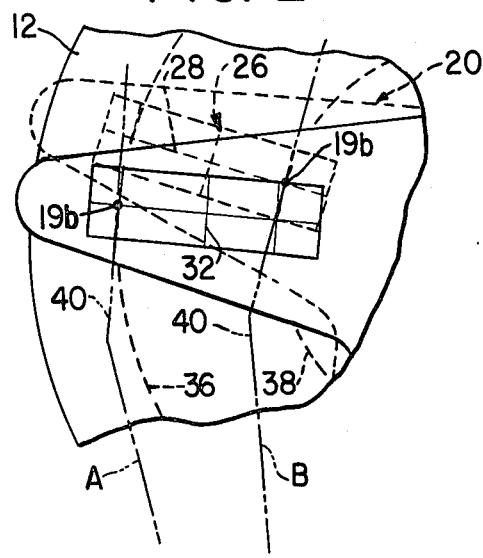
FIG. 2 is a fragmentary top view of the phonograph of FIG. 1 showing the alignment apparatus prepared for use in adjusting the optimum stylus offset angle.

Referring now to FIG. 2, there is illustrated the method of adjusting the cartridge for optimum stylus offset angle. For illustrative purposes, the adjustment is made first with respect to the longer of the two Baerwald radii. To make this first adjustment, the device 20 is rotated slightly in a counterclockwise direction and the tip of the stylus 19b is positioned to overlie the intersection of lines 28 and 30 (position A of line 40). The cartridge 18 is then loosened in its mounting and twisted to adjust its offset with respect to tone arm 15 so that the stylus shaft 19a lies in the same vertical plane as line 30. As a result of the construction of the device 20, this adjustment is reliably and conveniently achieved by the procedure described in detail below. The cartridge/tone arm combination is then aligned to the shorter Baerwald radius by rotating the device 20 clockwise to the position shown in phantom in FIG. 2 and bringing the tone arm to the position B of line 40, so that the stylus tip overlies the intersection of lines 28 and 34. The cartridge is then twisted, if necessary, so as to place the stylus shaft 19a in alignment with line 34 and is secured in that position.

Figure 3:
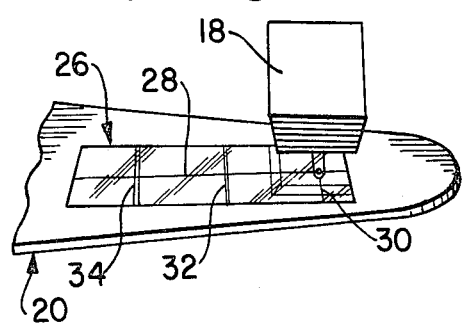
FIG. 3 is a fragmentary front prospective view showing the alignment apparatus in use for adjusting the offset angle of a phonograph cartridge.

The surface 26 is preferably mirrored by making its lower surface reflective, so that, the lines 28, 30, 32 and 34 on the top of surface 26 will generally appear as double lines (see lines 30 and 32 in FIG. 3), since a viewer sees not only the actual line, but also its reflection. The only time one of these lines will appear as a single line is when it is viewed very nearly perpendicularly when a line and its reflection appear to coincide. This feature of apparatus 20 proves particularly useful in aligning the stylus shaft 19a with respect to the lines 30 and 34, as explained above. For illustrative purposes, the alignment with line 30 will be described. Referring to FIG. 3, the operator first positions himself in front of the cartridge 18 so that he is able to see the reflection of stylus shaft 19a on surface 26. He then adjusts the tone arm and the position of apparatus 20 to place the stylus tip over the intersection of lines 28 and 30 and, keeping only one eye open, positions himself so that the line 30 appears as a single line. The apparatus 20 is then held stationary and the reflection of the stylus shaft 19a on the tone arm is observed to lie under line 30. The cartridge is then twisted to adjust its offset until the line 30 bisects the reflection of stylus shaft 19a parallel to its length. The cartridge may then be secured to the tone arm and stylus shaft 19a will lie in the same vertical plane as line 30. Assuming the stylus is correctly positioned on its shaft during manufacture, optimum alignment is then achieved.

Figure 4:
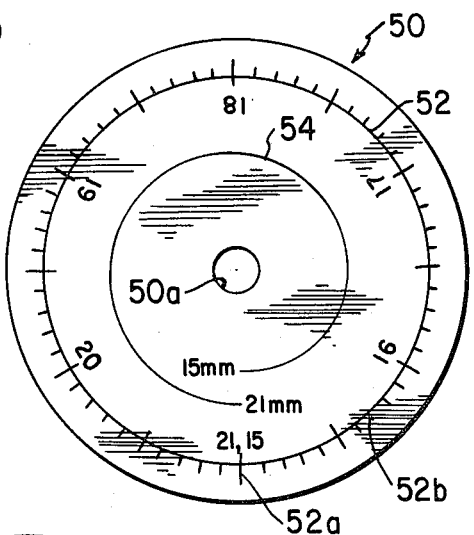
FIG. 4 is a plan view of an auxiliary gage useful with the alignment apparatus to measure stylus overhang of a cartridge mounted at the end of a pivoted tone arm.

FIG. 4 illustrates an auxiliary gage 50 which is useful with the apparatus 20 to measure the actual overhang of a cartridge/tone arm combination without swinging the tone arm in position directly over the spindle 14. This is a particularly important feature, since in many instances, for example in the case of a record changer, the tone arm is designed so that it cannot be swung all the way over to the spindle 14, and in all instances the protruding spindle 14 obstructs the cartridge 18 from descending to the turntable's surface, thereby preventing accurate measurement. The gage 50 is a flat disc, preferably made of a transparent plastic sheet material and is provided with an aperture 50a which is dimensioned to receive the spindle 14. The gage 50 includes a circular scale 52 near its periphery which is marked, at intervals, represented by major gradation markings, with the numerals 15–21. The numerals 15 and 21 correspond to the same major gradation marking 52a and each of the other numerals has a corresponding major gradation marking. Between consecutive numerals, gradation markings 52b are provided. Between the aperture 50a and the scale 52, the gage 50 includes a spiral curve 54. This spiral curve is designed so that every radius of gage 50 intersects the scale 52 at a gradation (or between gradations) indicating the distance of the corresponding intercept of spiral curve 54 from the center of aperture 50a. For example, a radius intersecting scale 52 at the fifth line after the number 18 will have an intercept on curve 54 at a distance of 18.5 millimeters from the center of aperture 50a.

Figure 5:
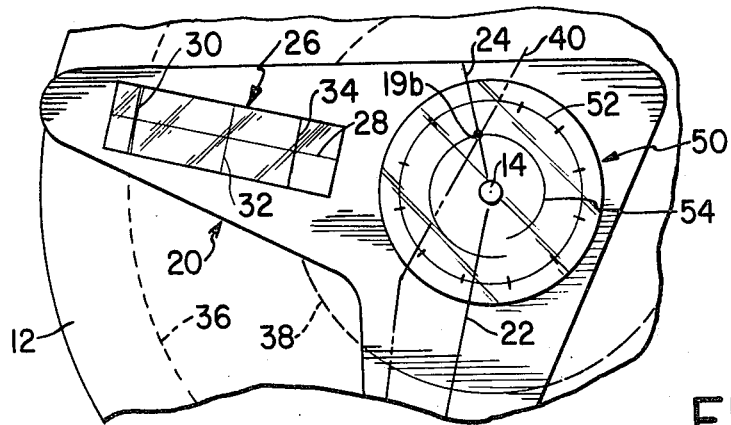
FIG. 5 is a fragmentary plan view as in FIG. 2 showing the auxiliary scale of FIG. 3 positioned for use on the alignment apparatus.

In order to use gage 50, the apparatus 20 is mounted on turntable 12 so that aperture 20a receives spindle 14. The gage 50 is then mounted on top of apparatus 20 so that aperture 50a receives spindle 14 (see FIG. 5). Inasmuch as gage 50 is transparent, the lines 22 and 24 of apparatus 20 are visible therethrough. The apparatus 20 is then rotated so that line 22 extends between the axes of spindle 14 and pivot 16, as when adjusting for optimum overhang. The tone arm 15 (as represented by the dashed line 40 in FIG. 5) is then positioned so that the tip of stylus 19 lies over line 24, and gage 50 is rotated until the spiral curve 54 intersects the line 24 at the point where the tip of stylus 19 lies. A very close approximation of stylus overhang is then obtained by reading the value at which the line 24 intersects the scale 52.

It should be noted that precise stylus overhang would be measured if line 24 formed an angle of 180 degrees with line 22. However, only a negligible error is introduced when line 24 forms an angle with line 22 which is close to 180 degrees, for example 170 degrees. This angle between the lines 22 and 24 is provided so that the tone arm need not be brought near the spindle 14 in order to make this measurement.

In view of the fact that an exceptionally reliable and convenient method for obtaining optimum overhang has already been described (i.e. use of the fixed point), it may not yet have been appreciated that after a cartridge has been adjusted for optimum stylus overhang, the actual overhang can be measured with the aid of gage 50 so that the effective tone arm length can readily be obtained from Table I by reading the tone arm length which corresponds to the measured overhang. Thus, gage 50 is an extremely accurate and convenient device for determining the effective tone arm length, and this is achieved without making any actual measurements of the tone arm itself. Of course, gage 50 could be used as an aid in adjusting the overhang as taught by the Audio Critic article.

Figure 6:
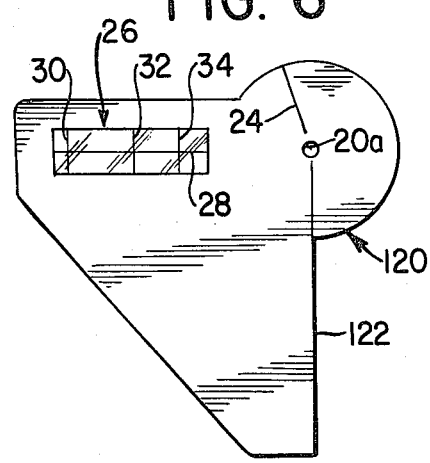
FIG. 6 is a plan view, on a reduced scale, showing an alternate embodiment of the alignment apparatus in which the indexing means is an edge of the apparatus itself.

FIG. 6 illustrates an alternate embodiment 120 of the alignment apparatus 20. In apparatus 120, elements which are identical to the corresponding elements in apparatus 20 are indicated with the same reference numerals (particular note should be made of the mirrored surface 26 with its scribed lines 28, 30, 32 and 34; the line 24; and the aperture 20a). The primary difference between the apparatus 120 and the apparatus 20 is that, in the apparatus 120, the edge 122 of the device is used to index its position in the same manner that line 22 of apparatus 20 was used. Otherwise, apparatus 120 has a similar construction to and is operated substantially in the same manner as apparatus 20. It will be appreciated, however, that the apparatus 20, owing to its shape, results in a saving in material, as well as a more pleasing appearance.

Although preferred embodiments of the invention have been disclosed for illustrative purposes, it will be appreciated by those skilled in the art that many additions, modifications and substitutions are possible without departing from the scope and spirit of the invention as defined in the accompanying claims. For example, it will be appreciated that an alignment apparatus in accordance with the present invention may have any of a variety of shapes without affecting its utility. The various lines and indexes of the devices 20 and 120 could, for example, also be placed on a disc resembling a record or could be marked or otherwise indicated directly on the top surface of the turntable or turntable mat.

TABLE I

| L Effective Arm Length (mm) | O Stylus Overhang (mm) | L Effective Arm Length (mm) | O Stylus Overhang (mm) |
|---|---|---|---|
| 200 | 21.1 | 34 | 17.7 |
| 01 | 20.9 | 235–36 | 17.6 |
| 02 | 20.8 | 37 | 17.5 |
| 03 | 20.7 | 38 | 17.4 |
| 04 | 20.6 | 39 | 17.3 |
| 05 | 20.5 | 34 | 17.7 |
| 06 | 20.4 | 240–41 | 17.2 |
| 07 | 20.3 | 42 | 17.2 |
| 08 | 20.2 | 44 | 17.0 |
| 09 | 20.0 | 46 | 16.8 |
| 210 | 19.9 | 47 | 16.7 |
| 11 | 19.8 | 248–49 | 16.6 |
| 12 | 19.7 | 250 | 15.5 |
| 14 | 19.5 | 53 | 16.3 |
| 15 | 19.4 | 54–55 | 16.2 |
| 16 | 19.3 | 256 | 16.1 |
| 17 | 19.2 | 257–58 | 16.0 |
| 19 | 19.0 | 259 | 15.9 |
| 220–21 | 18.9 | 260–261 | 15.8 |
| 22 | 18.8 | 62 | 15.7 |
| 23 | 18.7 | 263–64 | 15.6 |
| 24 | 18.6 | 265 | 15.6 |
| 25 | 18.5 | 266–67 | 15.4 |
| 26 | 18.4 | 268–69 | 15.3 |
| 227 | 18.3 | 270 | 15.2 |
| 228 | 18.2 | 271–72 | 15.1 |
| 229–30 | 18.1 | 273–74 | 15.0 |
| 231 | 18.0 | 75 | 14.9 |
| 32 | 17.9 | | |

TABLE I-continued

| L Effective Arm Length (mm) | O Stylus Overhang (mm) | L Effective Arm Length (mm) | O Stylus Overhang (mm) |
|---|---|---|---|
| 33 | 17.8 | | |

What is claimed is:

1. A method for use with a phonograph of the type incorporating a turntable adapted to have a record disc rested thereon for rotation about a first axis, a tone arm mounted near one of its ends for pivotal movement about a second axis and a cartridge mounted at the other end of said tone arm and having a stylus assembly with a stylus depending therefrom, said method being used for adjusting the overhang of said stylus in a procedure for aligning said cartridge with respect to said tone arm and turntable so as to minimize horizontal tracking error, said method comprising the step of adjusting at least one of said cartridge and said tone arm to make said stylus overlie a fixed point, said fixed point lying in a plane perpendicular to said axis at substantially a distance from said first axis defined by the equation:

$$d = \sqrt{L^2 - (L - O)^2}$$

where L is the effective tone arm length and O is the stylus overhang beyond said second axis which minimizes tracking error for a tone arm of that length.

2. In combination with the method of claim 1, a method for adjusting the offset angle between the plane of said stylus assembly and said tone arm, said method comprising the step of adjusting said cartridge with respect to said tone arm so as to make the plane of said stylus assembly tangent to the record groove at least at a distance from the center of the record equal to one of the Baerwald radii.

3. The method in accordance with claim 2 wherein said cartridge is adjusted so that the plane of said stylus assembly is taught to said groove at least at distances from the center of said record equal to both of said Baerwald radii.

4. Alignment apparatus for use with a phonograph incorporating a turntable adapted to have a record disc rested thereon for rotation about a first axis, a tone arm mounted near one of its ends for pivotal movement about a second axis and a cartridge mounted at the other end of said tone arm and having a stylus assembly with a stylus depending therefrom, said apparatus being used to align said stylus assembly with respect to said tone arm and said turntable, said apparatus comprising:
a main body having a fixed point indicium thereon;
means for mounting said main body in a fixed relationship to said turntable so that said fixed point indicium is substantially at a distance d from said first axis where:

$$d = \sqrt{L^2 - (L - O)^2}$$

where L is the effective length of said tone arm and O is the stylus overhand beyond said second axis which minimizes horizontal tracking error for a tone arm of that length; and
indexing means on said main body for orienting said apparatus so that said fixed point indicium lies on a line perpendicular to a line between said first and second axes.

5. Apparatus according to claim 4 wherein d is approximately 89.323 mm.

6. Apparatus according to claim 4 wherein said main body is a substantially planar member adapted to be rested on said turntable and said mounting means is an aperture dimensioned to receive a spindle on said turntable.

7. Apparatus according to claim 4 wherein said indexing means is a second indicium on said main body which is aligned between said first and second axes.

8. Apparatus according to claim 4 wherein said indexing means is an edge of said main body.

9. Apparatus according to claim 4 further comprising:
a mirror-like, substantially planar surface member on said main body;
at least one substantially linear indicium on said surface member and positioned to be perpendicular to a line between said fixed point indicium and said first axis at a distance from said first axis equal to a Baerwald radius.

10. Alignment apparatus for use with a phonograph incorporating a turntable adapted to have a record disk rested thereon for rotation about a first axis, a tone arm mounted near one of its ends for pivotal movement about a second axis and a cartridge mounted at the other end of said tone arm and having a stylus assembly with a stylus depending therefrom, said apparatus being used to align said stylus with respect to said tone arm and said turntable, said apparatus comprising:
a main body having a fixed point indicium thereon;
means for mounting said body in a fixed relationship on said turntable so that said fixed point indicium is at a predefined distance from said first axis;
indexing means on said main body for orienting said apparatus with respect to said second axis, said indexing means and said fixed point indicium being located with respect to each other so that said fixed point indicium overlies a predetermined point when said main body is oriented with respect to said second axis with said indexing means, said predetermined point being selected so that said tone arm and said cartridge are adjusted for stylus overhang so as to minimize horizontal tracking error when said stylus is positioned to lie over said fixed point indicium;
a reflective mirror-like, substantially planar, surface member in a fixed position on said main body; and
at least one substantially linear indicium on said surface member at a distance from said first axis equal to a Baerwald radius.

11. Apparatus according to claim 9 or 10 wherein said substantially planar member has a substantially linear indicium at a distance from said first axis equal to each of said Baerwald radii.

12. Apparatus according to claim 9 or 10 wherein said surface member comprises:
a substantially transparent sheet member having upper and lower surfaces said linear indicium being on said upper surface, said lower surface being adapted to be rested on said turntable; and
means on said lower surface which is reflective in the direction of said upper surface, so that said linear indicium appears as a single line when viewed only from a position substantially directly thereabove.

13. A method for adjusting the angle between said stylus assembly and said tone arm with an apparatus according to claim 12, after optimum stylus overhang has been obtained, said method comprising the steps of:
viewing one of said at least one linear indicium so that it appears as a single line;
positioning said tone arm so that said stylus overlies the intersection between said viewed indicium and a line from said first axis; and
twisting said cartridge to adjust the offset angle thereof so that said viewed indicium longitudinally bisects said stylus assembly.

14. In combination with an apparatus in accordance with any one of claims 4, 9 or 10, a gauge for use in measuring stylus overhang comprising:
a disc-shaped main body;
means for mounting said main body on said turntable for rotation about said first axis;
a spiral curve indicium on said main body having a starting and ending point, the distance from the center of said disc of any point on said spiral curve indicium being proportional to the rotational distance of said point from said starting point; and
gradation indicia near the periphery of said body and extending circumferentially thereat, said indicia including a representation at selected points therealong of the corresponding distance of said spiral curve from the center of said disc.

15. In combination with an apparatus in accordance with claim 12, a gauge for use in measuring stylus overhang comprising:
a disc-shaped main body;
means for mounting said main body on said turntable for rotation about said first axis;
a spiral curve indicium on said main body having a starting and ending point, the distrance from the center of said disc of any point on said spiral curve indicium being proportional to the rotational distance of said point from said starting point; and
gradation indicia near the periphery of said body and extending circumferentially thereat, said indicia including a representation at selected points therealong of the corresponding distance of said spiral curve from the center of said disc.

* * * * *